United States Patent [19]

Fabrizio

[11] Patent Number: 5,095,688
[45] Date of Patent: Mar. 17, 1992

[54] APPARATUS FOR THE RADIAL CENTRIFUGAL ADVANCE OF THE CORDS FROM THE GRASS-CUTTING HEADS FOR TRIMMERS

[75] Inventor: Arnetoli Fabrizio, Reggello, Italy

[73] Assignee: Arnetoli Motor Di Arnetoli Fabrizio, Florence, Italy

[21] Appl. No.: 605,227

[22] Filed: Oct. 26, 1990

[30] Foreign Application Priority Data

Oct. 30, 1989 [IT] Italy .................. 9554 A/89
Jul. 19, 1990 [IT] Italy .................. 9451 A/90

[51] Int. Cl.⁵ ............................ A01D 50/00
[52] U.S. Cl. ...................... 56/12.7; 56/12.1; 56/DIG. 17; 30/276
[58] Field of Search ............... 56/12.7, 1, 12.1, 16.4, 56/233, 239, DIG. 17; 30/276, DIG. 5

[56] References Cited

U.S. PATENT DOCUMENTS

4,242,797 1/1981 Palmieri et al. .................. 30/276
4,823,465 4/1989 Collins ........................... 56/12.7
4,882,843 11/1989 Baba ............................. 30/376
4,893,410 1/1990 Hoffman et al. .................. 56/12.7

Primary Examiner—Terry Lee Melius
Attorney, Agent, or Firm—McGlew & Tuttle

[57] ABSTRACT

In order to obtain a lengthening maneuver of the active ends emerging from the rotating housing (1, 5, 3) containing the bobbin or bobbins (16) of the cords (F) during the rotation of said housing, the bobbin (16) has in the wall (18) of the internal hole two series of mutually staggered teeth (20, 22; 120, 122), some (20; 120) of which are developed along one axial section and the others (22; 122) along the remaining axial section; an element (34, 30), which is capable of axial sliding movements, has a disk (30) which projects elastically below the housing (1, 5, 3) and is capable of being made to reenter by means of pressure on the ground, as well as entrainment teeth (36) which are axially slidable, rotationally engaged on said housing and capable of engaging alternately the teeth of the two series (20, 22; 120, 122) upon each axial stroke and thus of permitting each time a unitary angular advance in two stages.

18 Claims, 8 Drawing Sheets

APPARATUS FOR THE RADIAL CENTRIFUGAL ADVANCE OF THE CORDS FROM THE GRASS-CUTTING HEADS FOR TRIMMERS

SUMMARY AND OBJECTS OF THE INVENTION

The invention relates to a trimmer with a grass-cutter having a rotating housing from which emerge the active ends, which cut the grass, of the cords which are rolled up on at least one bobbin accommodated in the housing. These cords tend to wear and periodically have to be lengthened by making them project from the housing; this can be achieved by means of manual action with the machine at a standstill. The object of the invention is to make possible such a maneuver during the motion of the housing, as well as by hand also if necessary.

Essentially, according to the invention, it is envisaged that the bobbin has in the wall of the internal hole two series of mutually staggered teeth, some of which are developed along one axial section and the others along a successive axial section, that an element is provided, which is capable of axial sliding movements and forms a disk which projects elastically from the housing and is capable of being made to reenter by means of pressure exerted thereon, and that entrainment teeth are provided on said element, which are capable of interacting with said teeth of the two series, being axially slidable and rotationally engaged on said housing; said entrainment teeth are capable of engaging alternately the teeth of the two series upon each axial stroke and thus of permitting each time a unitary angular advance in two stages.

Said element can be accommodated in a seat for sliding formed by a depression for the disk member and by a wall, and it is stressed by a compression spring; the entrainment teeth slide in slots formed in said wall and project from it in order to engage the teeth of the bobbin.

In a similar manner to a known solution, said housing is formed by two cap members which can be engaged and disengaged in relation to one another, a first of these engaging the bobbin and the second bearing the exit bushes of the cords; in this case, said element is slidably accommodated in said first cap member and projects with the disk at the bottom from a depression of said first cap member as a result of elastic stress of said spring; said spring stresses the two members in the engaged state by means of an axial connection. Further features of the invention are set out in the appended claims.

BRIEF DESCRIPTION OF THE DRAWINGS

The invention will be better understood by following the description and the attached drawing which shows a practical non-limitative exemplary embodiment of the invention itself. In the drawing

FIG. 3 shows in isolation in cross-section a bobbin for the cords of the grass-cutter;

DETAILED DESCRIPTION OF THE PREFERRED EMBODIMENTS

According to what is illustrated in the drawing, with particular initial reference to FIGS. 1 to 12, a housing for accommodating the internal members of the apparatus comprises a first, upper cap member 1 and a second, lower cap member 3 which are the two main external components of the apparatus; the cap member 1 has on its perimeter a cylindrical wall 1A, in which are formed longitudinal seats to accommodate slides 5 which form the seats for exit and for sliding of the cords F for the cutting of the grass through the effect of the rapid rotation of the apparatus. Centrally, the cap member 1 of the housing engages a large pin 7 with a threaded axial cavity 9 for engagement on a rotating terminal S supported by the maneuvering shaft of the grass-cutting apparatus itself; the pin 7 ends in a threaded part 7A, to which a locking screw 10 (see also FIG. 12) with a retaining head 10A can be screwed; the screw 10 is in reality a cylindrical body with a threaded cavity to accommodate the threaded portion 7A of the pin 7. The seat for the pin 7 is formed in part in a central internal projection 1B of the cap member 1, which is surrounded by a circumferential series of receptacles 14 of two members of a coupling. The cap member 1 forms a support base 1C for a reel or bobbin 16 for the cord F. This bobbin 16 (see in particular FIG. 3 also) has centrally in the hub 16A a wide cylindrical hole 18, in the wall of which two series of teeth 20 and 22 are formed; the teeth 20 are developed from the upper edge to approximately half the height of the hole 18 and the teeth 22 are developed in the lower half of the wall of the hole 18; the teeth 20 and 22 are angularly staggered in relation to one another in such a manner that the teeth 20 are situated halfway in the interspace between the teeth 22 and vice-versa; the teeth project relatively little. The wings of the bobbin 16 can be passed through by radial slots of different depths.

Figure 4:
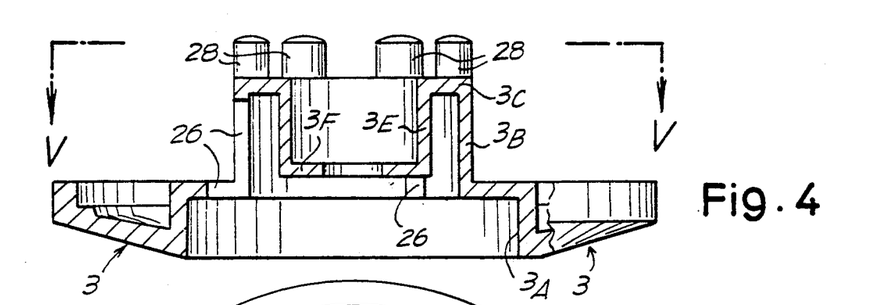
FIG. 4 shows in isolation the lower component of the housing, in diametral cross-section.
Figures 5, 8, 9, 10, 11, 12:
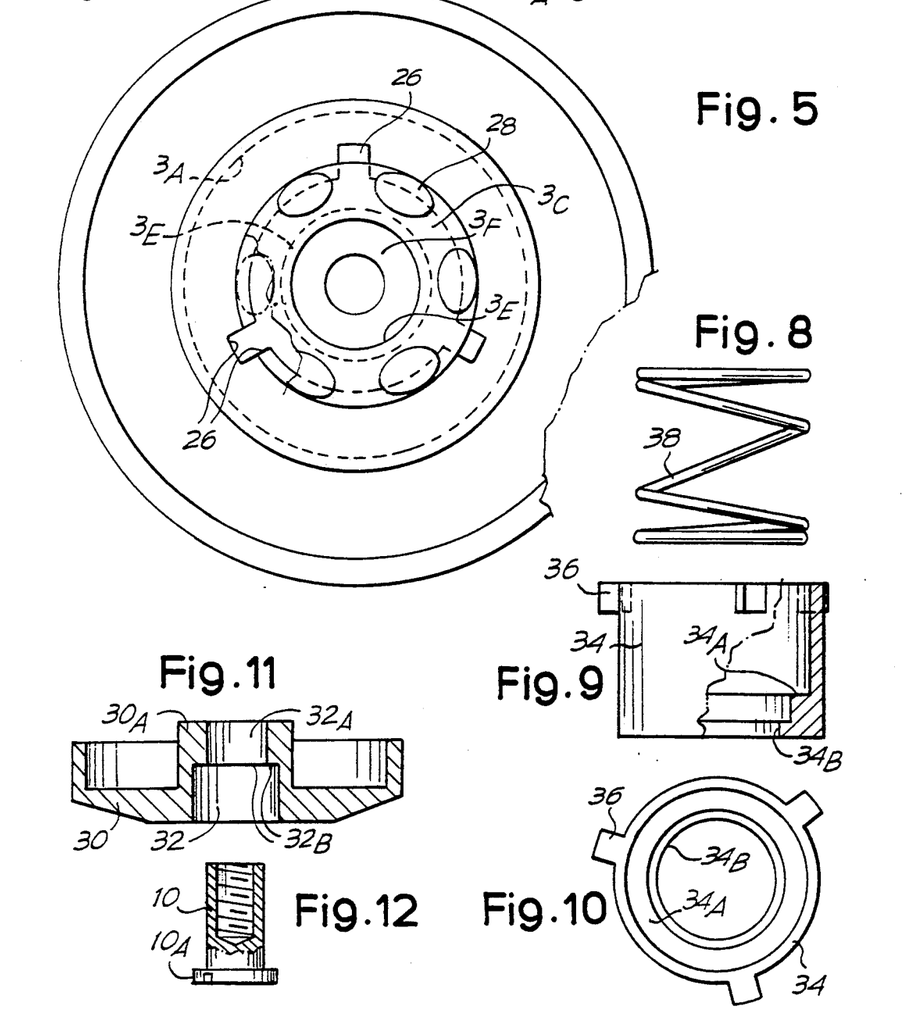
FIG. 5 shows an axial view of it along the line V—V in FIG. 4.
FIGS. 8, 9, 10, 11 and 12 show in isolation a spring, a sleeve with teeth in a view and partial axial cross-section and in a plan view, a maneuvering disk, a locking screw.
Figure 6:
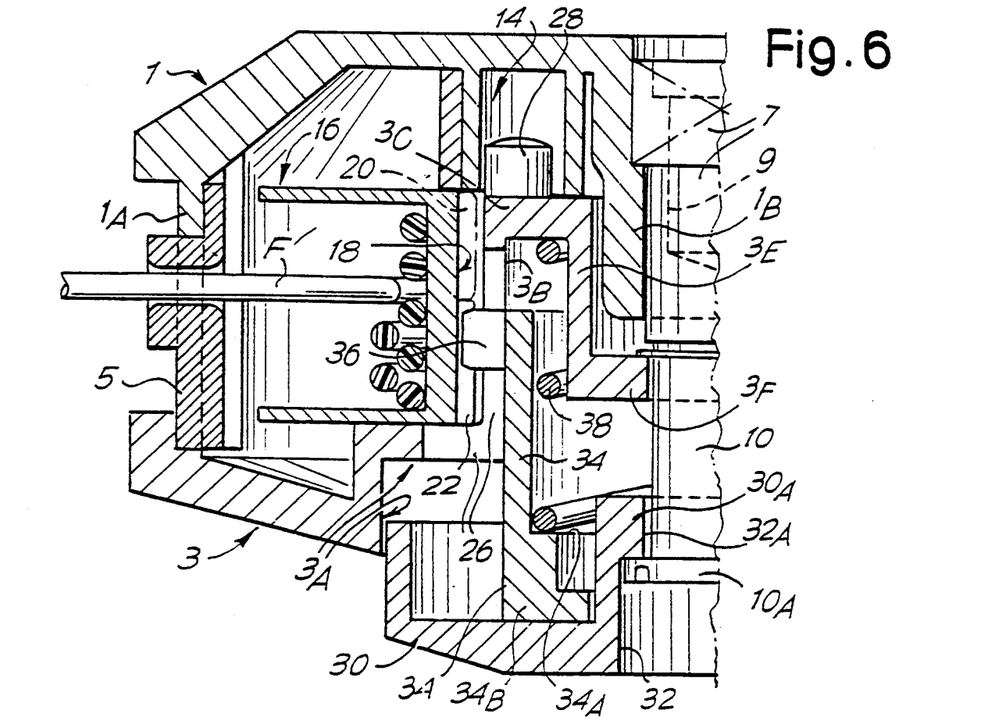
FIGS. 6 and 7 show an enlarged detail of FIG. 1 in order to illustrate two states of the components inside the housing, for the operation of lengthening of the cords.
Figure 7:
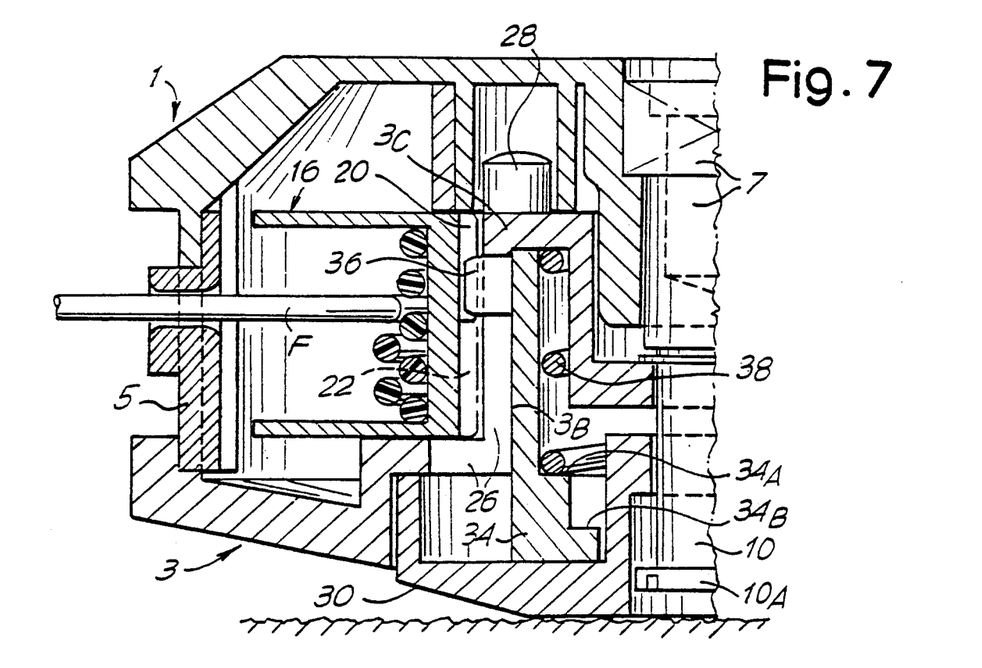

The lower cap member 3 is shaped with a wide lower circular depression 3A, from the bottom of which extends a hollow cylindrical portion 3B which ends in a bottom 3C; from this bottom, an internal cylindrical wall 3E with a bottom 3F is subsequently developed; the wall 3E with the bottom 3F is developed inside the cavity delimited by the cylindrical wall 3B. In this wall 3B, one or more (three in the drawing) longitudinal slots 26 are formed, which are subsequently developed in the bottom of the depression 3A also. In the bottom 3C of the cylindrical wall 3B, which extends essentially like a circular rim, studs 28 are developed with an arrangement, on the rim, corresponding to that of the seats 14, into which the studs 28 can penetrate. The axial coupling arrangement can also be inverted or varied.

The bottom 3F is reached by the pin 7, against the offset of which it can butt, and said bottom 3F is passed through by the screw 10 and by the threaded extension 7B of said pin 7.

30 indicates a maneuvering disk (see also FIG. 11) which can be accommodated partially in the lower depression 3A of the lower cap member 3. The maneuvering disk 30 has centrally an internal core 30A which is passed through by a hole 32 which narrows in the innermost section into 32A, creating a ledge 32B between the two diameters of said hole. The hole 32 is passed through by the screw 10, the head 10A of which can butt against said ledge or offset 32B. The core 30A of the disk 30 can perform an excursion, along the cylindrical wall of the screw 10, between the head 10A of the screw and the bottom 3F.

Inside the disk 30, a sleeve 34 is provided, which has, at its perimeter on the upper edge, projecting entrainment teeth 36 in a number corresponding to that of the slots 26, which said entrainment teeth 36 can pass into and slide in, projecting outside the cylindrical wall 3B. The sleeve 34 has at the bottom an internal annular ledge 34A and a shoulder 34B which defines a circular passage which is capable of accommodating the core 30A of the maneuvering disk 30. 38 indicates a helical spring which is mounted around the wall 3E of the cap member 3 and which reacts and rests both on the bottom 3C of the member 3 and on the ledge 34A of the sleeve 34, tending to distance them axially from one another. The sleeve 34 and the disk 30 form an axially movable element which is stressed downwards by the spring 38.

When assembly has taken place, the lower cap member 3 is supported against the edge of the wall 1A of the upper cap member 1 through the effect of the elastic action of the spring 38. In fact, in assembly, the pin 7 incorporated in the upper cap member 1 is engaged at the bottom by the screw 10, 10A which thus holds the disk 30 stressed by means of the sleeve 34 to rest on the head 10A through the effect of the spring 38; the sleeve 34 is supported inside the disk 30, being centered by the core 30A of said disk, and is guided within the cylindrical wall 3B of the cap member 3; this cap member 3, by means of the cylindrical wall 3E, is guided slidably on the core 1B of the upper cap member 1. Under conditions of rest (FIGS. 1 and 6), the spring 38 reacts on the ledge 34A of the sleeve 34 which is stabilized by the support of the sleeve 34 on the disk 30 and of the disk 30 on the head 10A of the screw 10; the spring 38 therefore stresses the cap member 3 upwards until said member rests on the edge of the wall 1A. The studs 28 are accommodated in the seats 14 in such a manner that there is an angular engagement between the cap members 1 and 3. The entrainment teeth 36 of the sleeve 34 engage both in the slots 26 and in the teeth 22 (see FIG. 6 in particular), thus ensuring the angular coupling between the bobbin 16 and the lower cap member 3; this latter is rotationally engaged with the studs 28 on the upper cap member 1.

Figure 1:
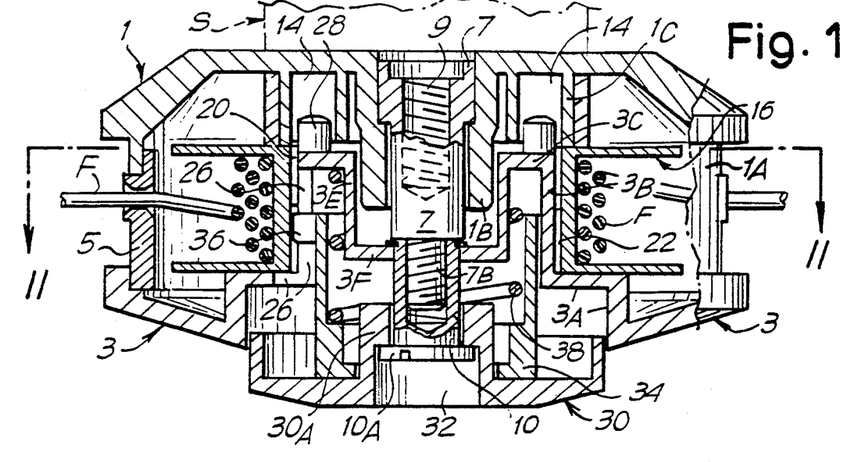
FIG. 1 shows a view in diametral cross-section of a grass-cutting or grass-shearing apparatus for a trimmer or similar, according to the invention.
Figure 2:
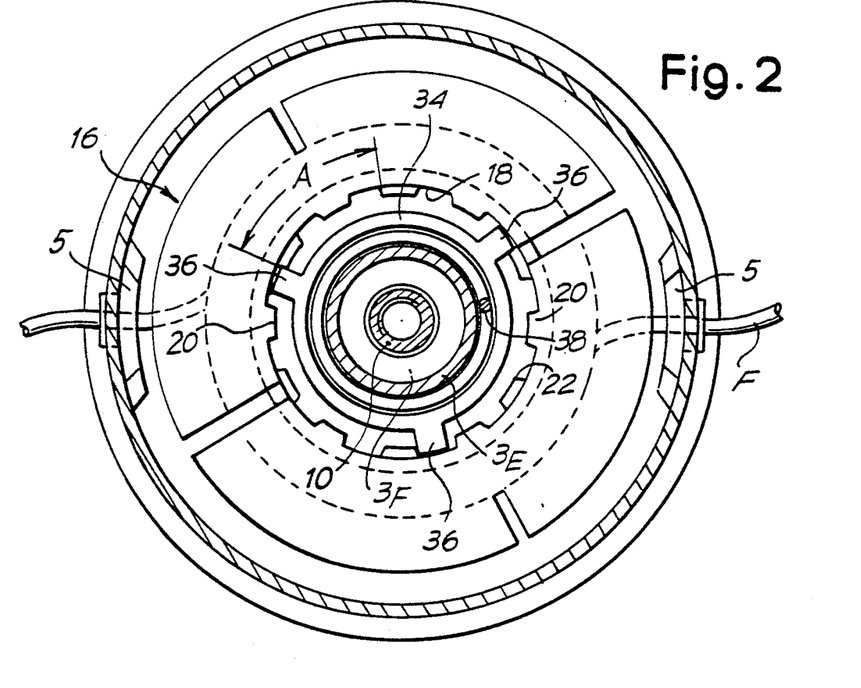
FIG. 2 is a view along the line II—II in FIG. 1.

When the terminal S of the maneuvering shaft of the grass-cutter is engaged in the pin 7, it causes the rotation of the entire assembly and therefore the radial tensioning, through the centrifugal effect, of the cords F which project from the exit bushes of the slides 5, consequently bringing about the action of cutting the grass through the effect of rotation of the entire assembly contained in the cap members 1, 3.

When, with the grass-cutter at a standstill, it is desired to lengthen the cords F by means of unrolling of the coils from the bobbin 16, it is possible to act upon the lower cap member 3 in order to distance it from the upper cap member 1, overcoming the action of the spring 38 until the studs 28 are made to come out of the seats 14, after which it is possible to rotate the lower cap member 3 in relation to the upper cap member 1 in order to bring about a slackening of the coils, for a desired amount, by means of the angular movement of the cap member 3 in relation to the cap member 1; upon starting the grass-cutter, the cords F, through centrifugal effect, are lengthened by an amount depending upon the slackening which took place of the final coils of the cords rolled up in the bobbin 16. Setting in rotation can be initiated after the lower cap member 3 has been released and pushed back by the spring 38 so as to make the studs 28 penetrate the seats 14 which again correspond to them.

The lengthening of the cords F can also be carried out in another manner and in particular also during the rotation of the assembly contained in the cap members 1, 3, that is to say without stopping the grass-cutter. To this end, it is only necessary to press by means of the maneuvering shaft of the grass-cutter and the rotating terminal S—which is engaged on the assembly contained in the cap members 1, 3—against the ground, so as to press the maneuvering disk 30 into the depression 3A formed at the bottom by the cap member 3; by pressing the assembly on the ground, the disk 30 therefore reenters the depression 3A through the effect of elastic yielding of the spring 38; under these conditions, the sleeve 34, like the disk 30, also advances and its entrainment teeth 36 slide in the slots 26 until they disengage themselves from the lower teeth 22 of the bobbin 16 and penetrate the interspaces between the upper teeth 20 of said bobbin; at this moment, the bobbin is no longer restrained by the teeth 22 and can rotate around the cylindrical wall 3B through the effect of the centrifugal stress to which the cords F, which project from the bushes of the slides 5, are subjected, in relation to the rotating assembly 1, 3 and to that contained in it. The relative angular movement of the bobbin 16 is interrupted when the teeth 36 come to rest against the teeth of the upper series 20 of the bobbin 16; there is thus a first angular advance which is equal to half the angle A indicated in FIG. 2. By stopping the pressure of the disk 30 on the ground, that is to say raising the assembly 1, 3 and that contained in it from the ground again, the spring 38 brings the disk 30 back until it rests against the head 10A of the screw 10; the entrainment teeth 36 thus slide in the slots 26 and return to the level of the teeth 22; under these conditions, there is a second relative angular advance of the bobbin 16 in relation to the rotating assembly 1, 3 and this therefore completes the angular excursion A, by which the bobbin 16 is made to advance, with the corresponding unrolling of the cords F, each time the assembly is pressed with the disk 30 against the ground for its penetration into the depression 3A, and the subsequent raising of it again. Upon each pressing of the disk 30, there is an angular advance A of the bobbin and therefore by repeating this operation it is possible to obtain a desired lengthening of the cords F by adding together the various unitary lengthenings A, each of such unitary lengthenings being obtained in two stages during the pressing of the disk 30 and the release of the disk 30 from the pressure against the ground. It is thus possible to carry out the desired lengthening of the cords F, which are to mow the grass, during the rotational operation of the grass-cutter also.

Figure 13:
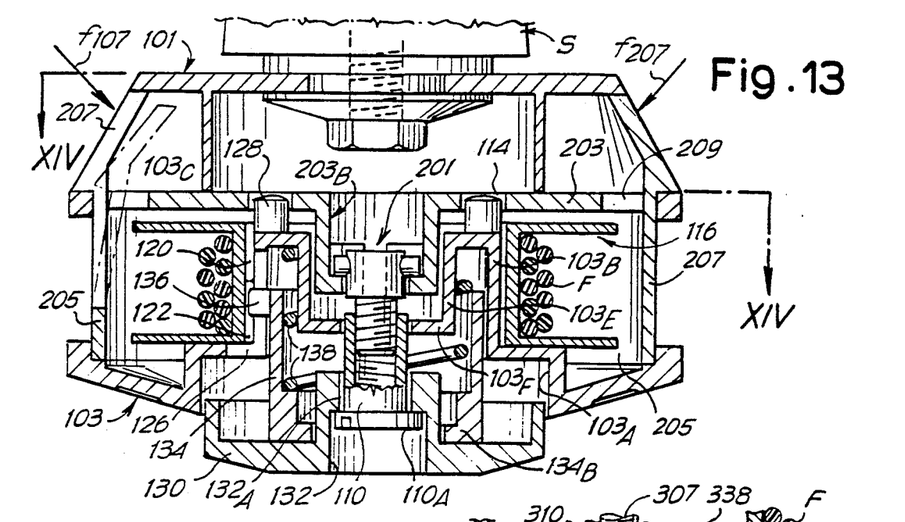
FIG. 13 shows a view in diametral cross-section of an embodiment which is modified in relation to FIG. 1.
Figures 14, 15, 16:
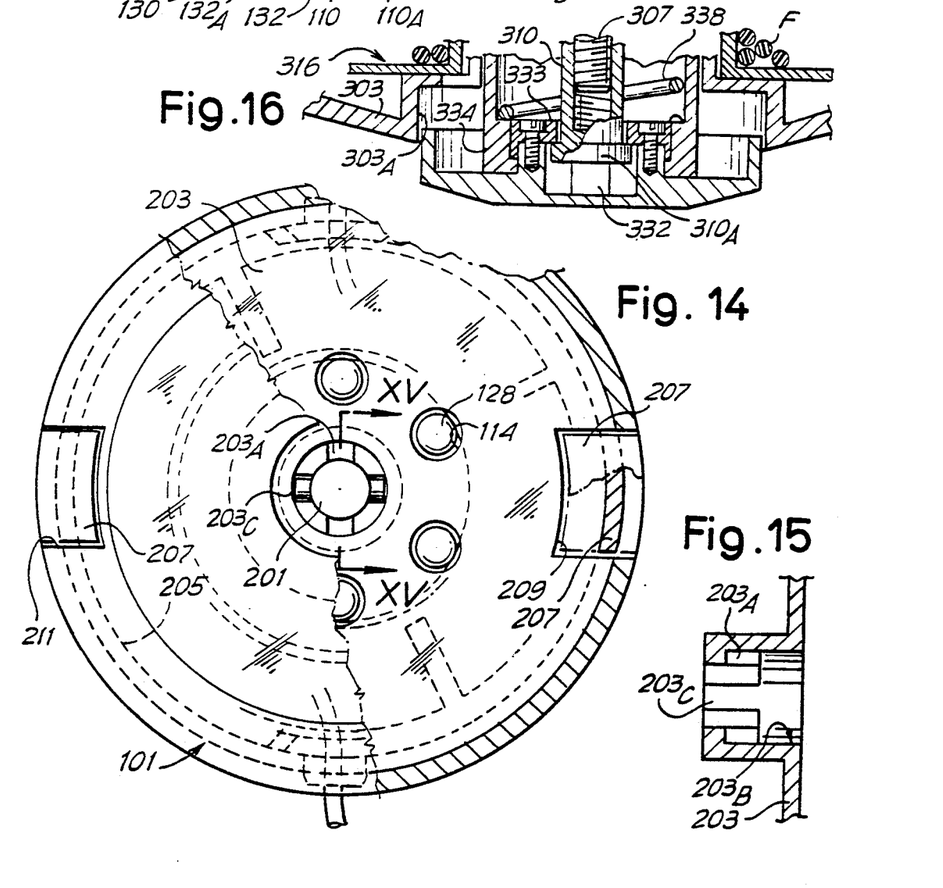
FIG. 14 shows a view and partial cross-section according to the broken line XIV—XIV in FIG. 13.
FIG. 15 shows a local cross-section according to XV—XV in FIG. 14.
FIG. 16 shows an alternative embodiment.

In FIGS. 13 to 15, a solution is shown, which is modified in relation to that described above, for the adaptation of the invention to another embodiment of the assembly contained in the cap members of a grass-cutter. In this embodiment, the members corresponding to the preceding embodiment are indicated by the same references increased by "100", whereas modified parts are briefly described below. Whereas, in the preceding embodiment, the dismantling of the internal members can be achieved by unscrewing the screw 10, 10A and then removing the members which are after all restrained by this screw, in the case in FIGS. 13 to 15 a coupling between the two cap members 101 and 103 is provided by means of a bayonet assembly which comprises a core 201 provided with radial studs, which is engaged on the screw 110 and which can be accommodated in two seats 203A of a receptacle 203B formed by a plate 203; said plate 203 is integral with a cylindrical wall 205, having a function similar to that of the cylindrical shell 5 in the preceding example. The plate 203 is provided with holes 114 which have the function of the seats 14 in the preceding example, to interact with the studs 128 formed after all by the lower cap member 103 in the manner already described. By rotating the core 201 of the bayonet joint by means of external maneuvering of the screw 110, 110A, the release is brought about from said bayonet joint of the radial studs which pass through channels 203C arranged in quadrature in relation to the seats 203A; suitable expedients, such as a spring or a retaining member, ensure the maintenance of the bayonet joint in the anchorage state, until the screw 10 is not acted upon. The plate member 203, 205 is coupled to the upper cap member 101 by means of elastic extensions 207 which are formed from the shell 205 in the area of openings 209 in the plate member 203; the elastic extensions 207 form engagement teeth in the area of openings 211 which are provided in the cap member 101 for the snap-engagement and for the release by means of pressure according to the arrows f207 exerted on the end parts of the elastic extensions 207; by means of this pressure and therefore by means of the yielding of the elastic extensions 207 towards the inside, it is possible to release from the cap member 101 the component formed by the plate 203 and by the cylindrical wall 205, from which the extensions 207 originate.

In this case also—as in the preceding case—by elastically distancing (by means of the compression of the spring 138) the cap member 103 from the assembly 205, 203 and 201 engaged by the elastic extensions 207, the studs 128 are released from the seats 114 and it is possible manually to bring about the relative rotation between 101 and 103 and the slackening of the coils in order to achieve the lengthening of the projecting cords F, in order then to recouple the studs 128 in the seats 114 after a desired angular excursion; the recoupling is obtained by means of the elastic return of the spring 138 which brings the cap member 103 back against the cylindrical wall 205, returning the studs 128 into corresponding seats 114.

By means of the pressure of the disk 130 on the ground, and therefore again by means of a compression of the spring 138, the unitary advances already described take place through the effect of the excursion of the entrainment teeth 136 which, by coming out of engagement with the teeth 122 of the lower rim of the bobbin 116, come to rest against the teeth of the upper series which correspond to 20, in order then to return into engagement with the teeth 122 after an excursion equal to the pitch between the teeth 122; the operation can be repeated as in the preceding case, by means of a new pressure of the disk 130 on the ground.

In the embodiments already described above, the screw member 10 or 110 can be maneuvered with a tool for dismantling and assembly. As an alternative, it is also possible to envisage that said screw member be made in order to be restrained on the disk 30 or 130 angularly but slidably in an axial direction, as a result of which it is possible to effect the maneuver by means of easy manual action on said disk. In FIG. 16, an embodiment of this type is shown, with references increased by "300" for the equivalent components to those of the first example. The disk 330 has a continuous lower wall and a non-circular, for example hexagonal, internal cavity 332 for axial sliding; in this cavity, the head 310A (correspondingly shaped, for example hexagonal) of the screw member 210, equivalent to 10 or 110, engages angularly but in an axially slidable manner; said head 310A is restrained in the cavity 332 for sliding by a retaining ring 333 or similar. The screw 310 can thus be maneuvered by means of the disk 330 which projects from the depression 303A of the cap member 303. The continuous closure of the disk impedes the penetration of dirt and earth to the screw 10 or 110.

Modified embodiments of the device are possible. For example, it would be possible to exclude the maneuver of uncoupling and of manual rotation between the two cap members 1 and 3 or 101 and 103, by omitting the studs 28 or 128 and the seats 14 or 114, and therefore providing only the angular movement of the bobbin of the cords through the effect of the pressure of the disk 30 or 130 on the ground during setting in rotation.

It is also possible to provide two or more bobbins 16 mounted on the cylindrical core of the part 3B, suitably lengthened. In this case, the sleeve 34 will have teeth 36 on two levels, in order to operate at the level of each bobbin which has the two series of teeth 20, 22.

FIGS. 17 to 20 show a modified embodiment, wherein a similar mechanism for lengthening of the cords is used in combination with a remote-control means.

Figure 20:
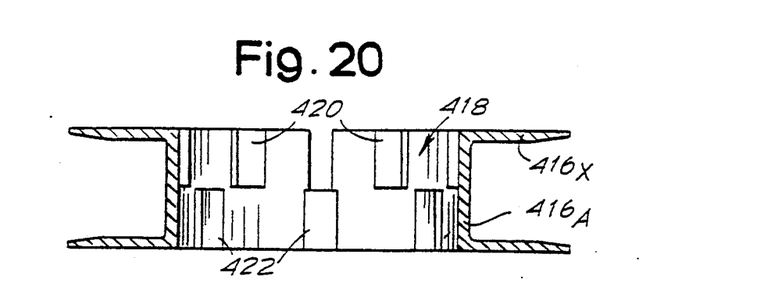
FIG. 20 shows a longitudinal cross-section of a bobbin on which the cord is rolled up.

According to the embodiments of FIGS. 27 to 20, the device comprises a housing constituted by a first, lower cap member 401 and a second, upper cap member 403, which are the two main external components of the apparatus; the cap member 403 has on its perimeter a cylindrical wall 403A, in which seats are formed to accommodate bushes 405 which form the passages for the exit and the sliding of the cords F for cutting. Centrally, the cap member 403 engages a large pin 407 with a threaded end portion 409 which is capable of engaging on a rotating terminal S supported by the maneuvering shaft A of the grass-cutting device. At the opposite end, the pin 407 ends in a portion 407A which has a threaded axial hole, into which a locking screw 410 can be screwed.

The cap member 401 has a bottom portion 401C, on which rests the lower bobbin 416X of a pair of bobbins 416X, 416Y, on which lengths of cutting cord F are rolled up. Each bobbin 416X, 416Y has centrally in the hub 416A a wide cylindrical hole 418, in the wall of which two series of teeth 420 and 422 are formed. The teeth 420 are developed from the upper edge to approximately half the height of the hole 418 and the teeth 422 are developed in the lower half of the wall of the hole 418. The teeth 420 and 422 are angularly staggered in relation to one another in such a manner that the teeth 420 are situated halfway in the interspace between the teeth 422 and vice-versa. The teeth project relatively little. The wings of the bobbin can be passed through by radial slots of different depths.

Figure 17:
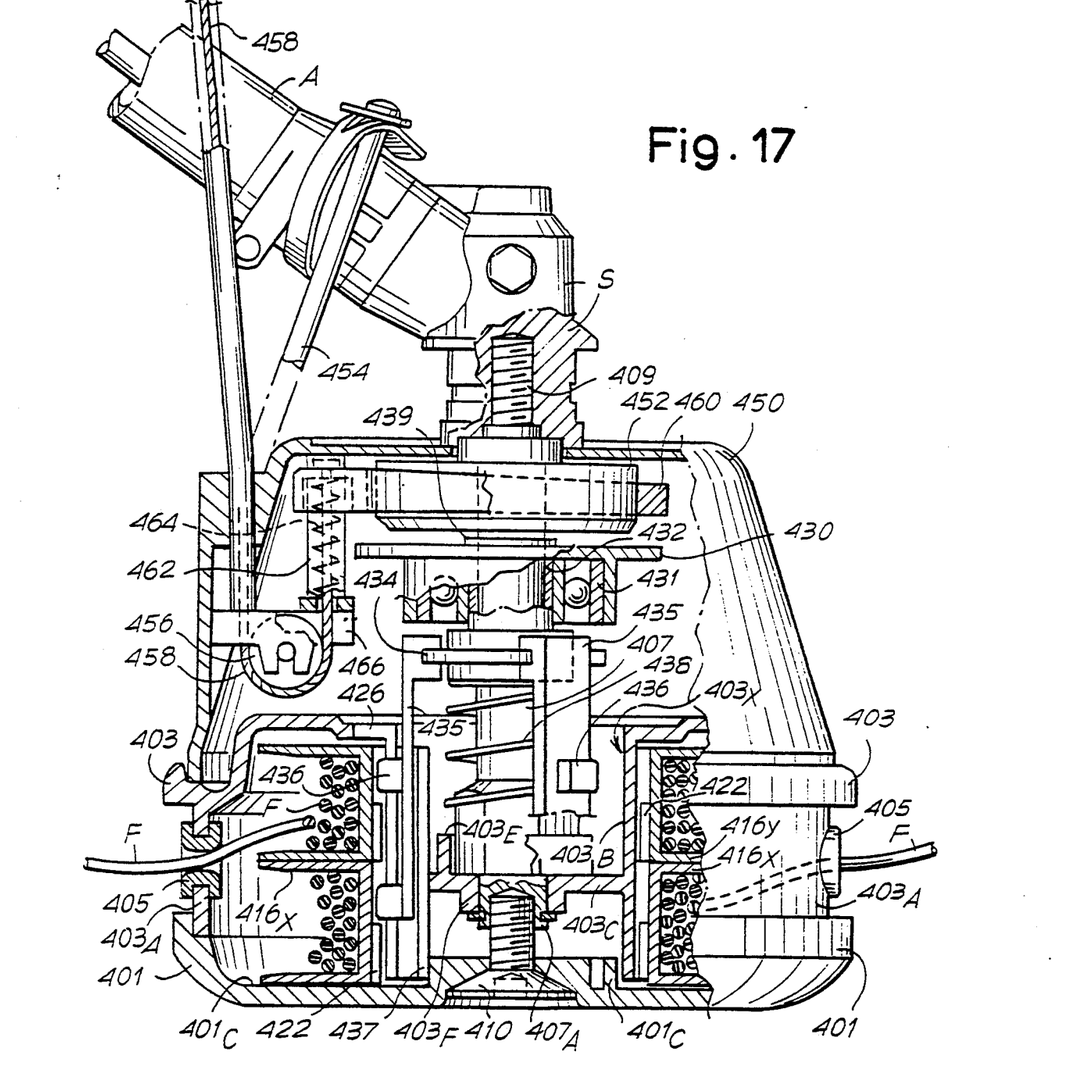
FIG. 17 shows an axial cross-section of the device according to the invention, in the state of normal operation in a different embodiment.
Figure 18:
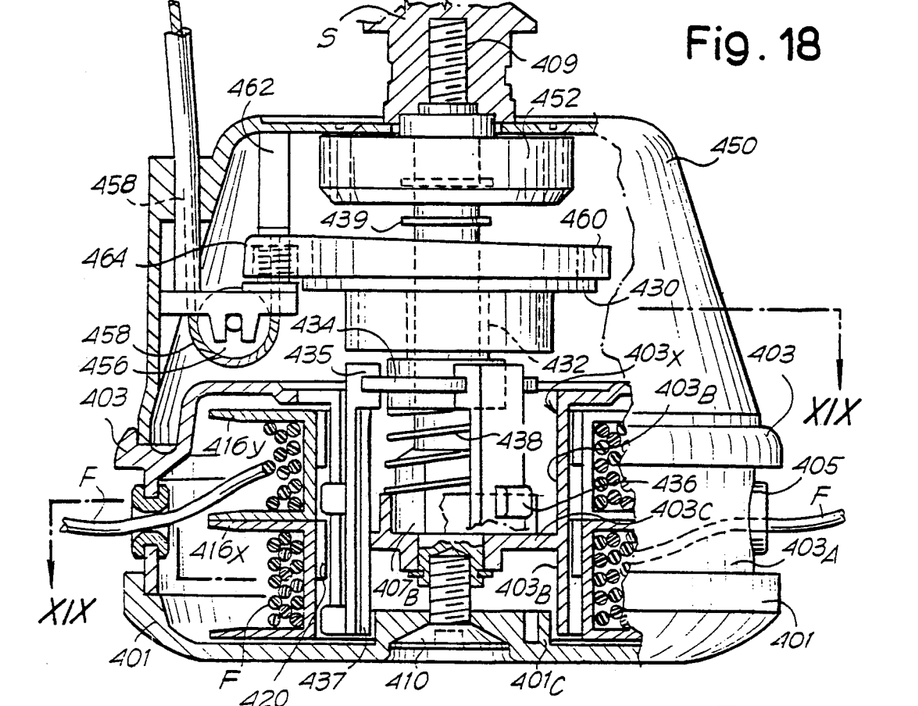
FIG. 18 shows, similarly to FIG. 17, an axial cross-section of the device in an intermediate stage of the operation of lengthening of the cords.
Figure 19:
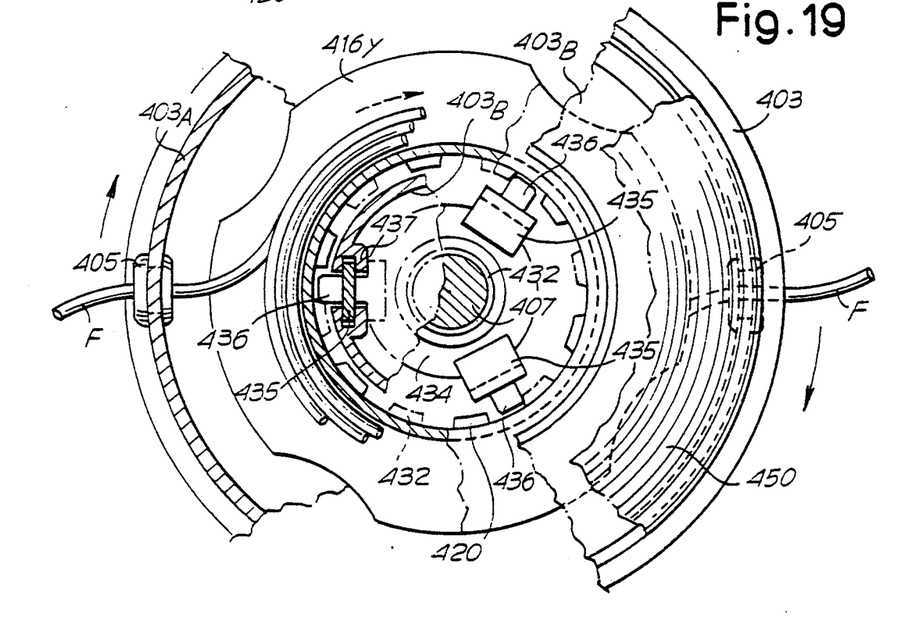
FIG. 19 shows a transverse cross-section according to XIX—XIX in FIG. 18.

The upper cap member 403 is shaped with a wide upper depression 403X defined by a cylindrical wall 403B, in an intermediate section of which a transverse wall 403C is arranged. From this transverse wall, a prismatic wall 403E of hexagonal cross-section, and a collar 403F, is subsequently developed. In the cylindrical wall 403B, one or more (three in the drawing) longitudinal slots 426 are formed, which are developed over the entire length of the cylindrical wall 403B.

The pin 407 passes through the transverse wall 403C and axially through the prismatic wall 403E and the collar 403F. The upper cap member 403 is locked on the pin 407 in an axial direction by means of a shoulder formed on the pin itself by a hexagonal prismatic portion 407B and by an elastic ring. The form coupling provided by the hexagonal prismatic portion 407B and by the prismatic wall 403E makes it possible to rotate the upper cap member 403 jointly with the pin 407.

430 indicates a maneuvering disk which projects above the upper cap member 403. The maneuvering disk 430 is supported idle on the pin 407 by means of a bearing 431. As will be described below, the maneuvering disk 430 can perform an axial excursion along the pin 407 under the control of suitable operating means. The support bearing 431 of the maneuvering disk is mounted on a collar 432 of a small disk 434 which bears a plurality (three in the example of the drawing) of extensions 435. In order to facilitate the pressing operations of the various pieces, the extensions 435 are made separately from the small disk 434 and are mounted on the latter by jointing. Each extension 435 is provided with a pair of entrainment teeth 436 which project through the longitudinal slots 426 made in the cylindrical wall 403B and are slidable along these. The longitudinal sliding movement of the entrainment teeth 436 along the slots 426 is achieved by means of the axial movement of the small disk 434 along the axis of the pin 407 in the manner described below. In their sliding movement, the extensions 435 bearing the entrainment teeth 436 are guided by guide channels 437 made on the cylindrical wall 403B parallel to the longitudinal slots 426 on both sides of these (see FIG. 19 in particular).

It is clear that the number of bobbins can be different from that illustrated, for example one single bobbin can be provided or more than two bobbins also. More than one cord can also be rolled up on each bobbin. In each case, the corresponding number of entrainment teeth 436 is to be provided on each extension 435.

438 indicates a helical spring which is mounted on the pin 407 and which reacts and rests at the bottom on the prismatic wall 403E and at the top on the small disk 434, maintaining this latter distanced from the upper cap member 403. The small disk 434 together with the associated extensions 435 and the maneuvering disk 430 form an axially movable element which is stressed upwards by the spring 438 and which has the function, as will be described below, of causing the rotation of the bobbins 416X and 416Y in relation to the cap members 401 and 403, in order to lengthen the cords F which project from the head of the trimmer.

When assembly has taken place, the lower cap member 401 is supported against the edge of the wall 403A of the upper cap member 403 and is gripped by means of the screw 410. The relative rotation between lower cap member 401 and upper cap member 403 is prevented by a series of extensions 401C which are integral with the lower cap member 401 and which are inserted between adjacent channels 437 of the cylindrical wall 403B of the upper cap member 403. In the rest position, the disk 430 is maintained in its position of maximum distance from the cap member 403 through the effect of the spring 438, said position being defined by an elastic ring 439 on the pin 407. In this state, the entrainment teeth 436 are situated in the area of the upper teeth 420 of each of the two bobbins 416X and 416Y of cord, providing an angular coupling between said bobbins and the housing formed by the two cap members 401 and 403.

Above the housing formed by the cap members 401 and 403, a protection housing 450 is arranged, which is supported by means of a bearing 452 on the pin 407. The protection casing 450 is restrained on the maneuvering shaft A of the trimmer by means of an inverted U-shaped bracket 454. Inside the protection casing 450, a pulley 456 is supported, on which a cable 458 is directed, which serves to remote control the lengthening of the cords F. One end of the cable 458 is anchored on a control ring 460 which is coaxial with the pin 407 and slidable in an axial direction in relation to it. The axial movement of the control ring 460 is guided by means of a pair of guides 462 which are made inside the protection casing 450. In rest position (FIG. 17), the control ring 460 is maintained in its upper position—that is to say at maximum distance from the maneuvering disk 430 underneath—by a compression spring 464 which reacts between the control ring 460 and a pair of support brackets 466 of the pulley 456.

When the terminal S of the maneuvering shaft of the grass-cutter is engaged on the pin 407 by means of the threaded end portion 409 of this latter, the assembly formed by the cap members 401 and 403 is set in rotation, and this rotation causes the radial tensioning, through centrifugal effect, of the cords F which project from the bushes, thus bringing about the action of cutting the grass. When it is desired to lengthen the cords F, for example in order to restore them after they have been worn down, it is only necessary to pull the cable 458, without the need to stop the rotation of the head of the device and without touching it with the hands. In fact, by pulling the cable 458, this causes a downward stroke of the control ring 460 against the action of the compression spring 464. The control ring 460 assumes the position shown in FIG. 18. During its downward stroke, the control ring 460 comes into contact with the upper surface of the maneuvering disk 430, causing it to move downwards against the action of the counteractive spring 438. Since the maneuvering disk 430 is mounted idle by means of the interposition of the bearing 431, when the control ring 460 comes into contact with the maneuvering disk 430, the latter stops rotating in relation to the protection casing, so that there is no relative movement between control ring 460 and maneuvering disk 430. At the same time, by virtue of the bearing 431, the small disk 434 remains free to rotate jointly with the housing formed by the cap members 401 and 403. The downward movement of the maneuvering disk 430 causes an axial sliding of the small disk 434 along the pin 407. This movement causes a sliding of the entrainment teeth 436 along the slots 426 and therefore the release of the entrainment teeth from the upper teeth 420 of the two bobbins 416X and 416Y. In the embodiment described, the maneuvering disk 430 is mounted by means of a bearing in order to avoid relative sliding between said disk and the control ring 460. However, it is also possible to mount the maneuvering disk 430 without bearing and to make said maneuvering disk and the control ring 460 of suitable materials (for example one of synthetic resin and the other of metal) so as to reduce the friction between them during contact.

In the state of maximum lowering of the control ring 460 (shown in FIG. 18), the extensions 435 restrained on the small disk 434 rest on the upper edge of the guide channels 437 and the entrainment teeth 436 are at the height of the lower teeth 422 of the respective bobbins 416X, 416Y. As a result of the staggered arrangement of the teeth 420 and 422 respectively, and of the rapid rotation of the bobbins 416X, 416Y, when the entrainment teeth 436 are released from the upper teeth 420, said bobbins rotate in relation to the housing formed by the cap members 401 and 403 by an amount equal to the stagger between the upper teeth 420 and the lower teeth 422, that is to say equal to approximately half the pitch of the teeth themselves. When the cable 458 is released, the control ring 460 distances itself from the disk 430 under the action of the spring 464, and the small disk 434 with the associated extensions 435 is brought back into the original rest position of FIG. 1. With this upward stroke, the entrainment teeth 436 are released from the lower teeth 422 of the bobbins 416X, 416Y and engage again with the upper teeth 420, allowing the bobbins themselves a further rotation of half the pitch in relation to the cap members 401, 403. Altogether, therefore, with one pull of the cable 458, a relative rotation between bobbins 416X, 416Y and housing 401, 403 is caused, which is equal to the pitch between the teeth 420, and therefore a predetermined lengthening of the cords F. From what has been described, it emerges that the entire operation of lengthening of the cords can take place by means of remote maneuvering, without touching the head of the device and without stopping its rotation.

Figure 21:
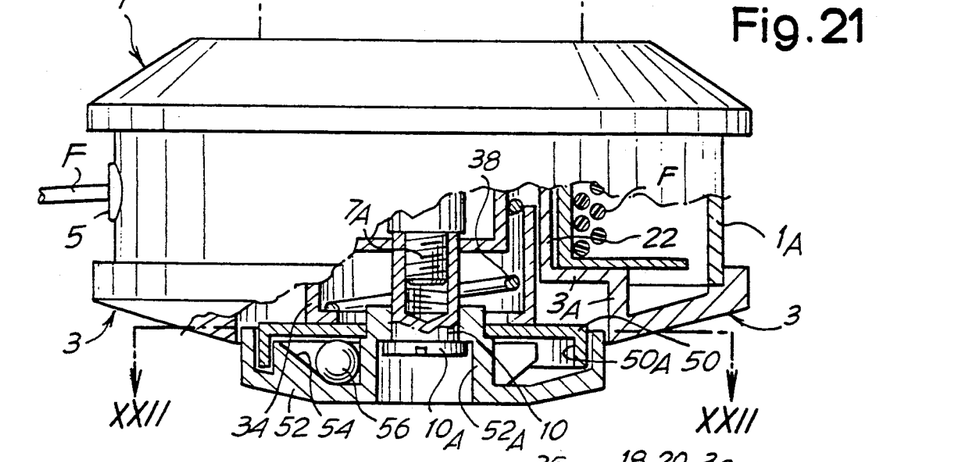
FIG. 21 shows an embodiment similar to the one of FIG. 1, with a device for automatic lengthening of the cords by means of centrifugal action.
Figures 22, 23:
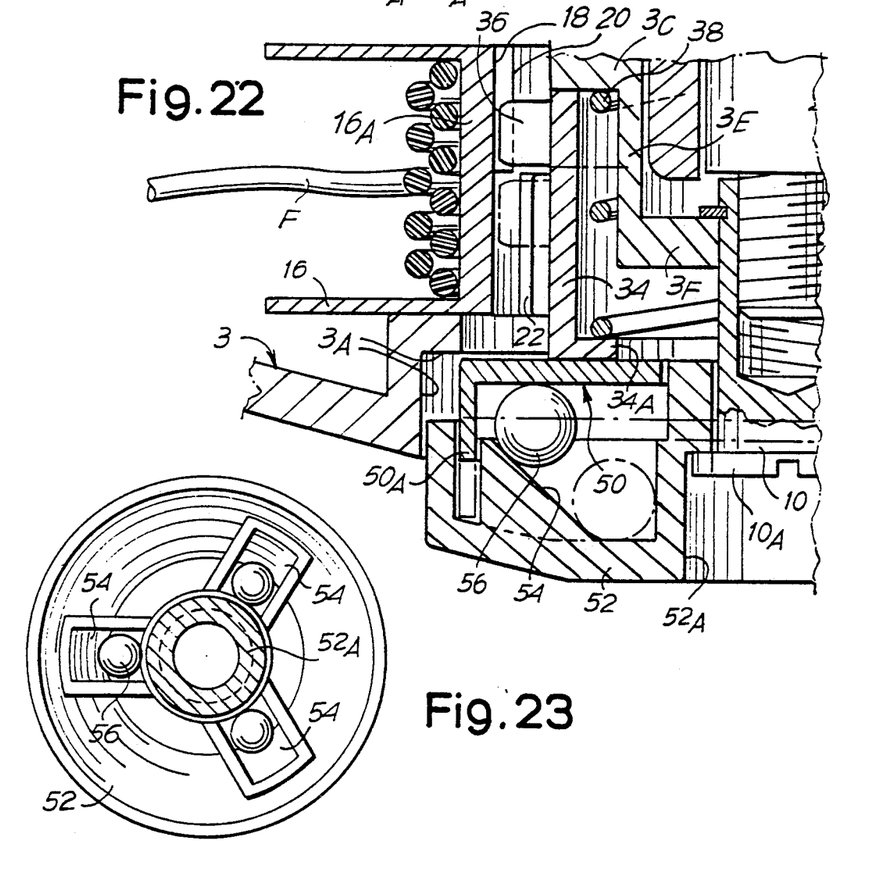
FIG. 22 shows an enlarged detail of FIG. 21 in a different attitude.
FIG. 23 is a section on line XXIII—XXIII of FIG. 21.

FIGS. 21 to 23 show an embodiment similar to that of FIGS. 1 to 16. Similar or corresponding parts are indicated with the same reference numbers.

The device of FIG. 21 is provided with a disk 50 (having the same functions as disk 30), which is part of the sliding element 34, 50. A cover 52 forms, in combination with disk 50, a housing for a set of balls 56 which are retained between inclined rolling surfaces 54 and the planar lower surface of disk 50. As clearly shown in FIG. 23, there are provided three balls 56 resting on three corresponding inclined rolling surfaces (54). During normal working the balls 56 are maintained by the action of spring 38 in the position of FIG. 21, i.e. close to the rotation axis of the device. When the ends of cords F, projecting from the housing 1, 3, wear out due to the cutting action which they perform on the grass, the rotational speed of the device increases. Correspondingly, a higher centrifugal force is exerted on the balls 56. The inclination of surfaces 54, the weight of balls 56 and the stiffness of spring 38 are chosen in such a way that the centrifugal force acting on the balls will overcome the elastic force of the spring 38 for a given value of the rotational speed, i.e. for a given degree of wear of the cords F. When this happens, the disk 50 is moved upwards up to the position shown in FIG. 22 and the bobbin 16 is made to rotate as described with reference to FIGS. 1 to 16. This limited rotation is sufficient for lengthening the cords F, thus slowing down the rotation of the device. Consequently, the balls 56 are moved back to the position of FIG. 21 due to the action of spring 38 and to the reduced centrifugal force acting on the balls 56. This causes a further rotation of the bobbin 16 and thus a further pay-out of cords F.

The device shown in FIGS. 21 to 23 is able to operate in three different ways, namely:

a) automatically by centrifugal action by means of balls 56, b) manually when the device is in motion by pressing the cover 52 against the ground, or c) manually after stopping the device by disengaging the caps 1 and 3 from each other and rotating one of them with respect to the other.

It should, however be noted that one or two of these modes of operation could be renounced. For example, the two caps 1, 3 could be solid to each other, so that mode (c) is not available, and/or by engaging the cover 52 firmly to the cap 3, so that mode (b) (or (b) and (c)) are not available, and the device operates only automatically.

Figure 24:
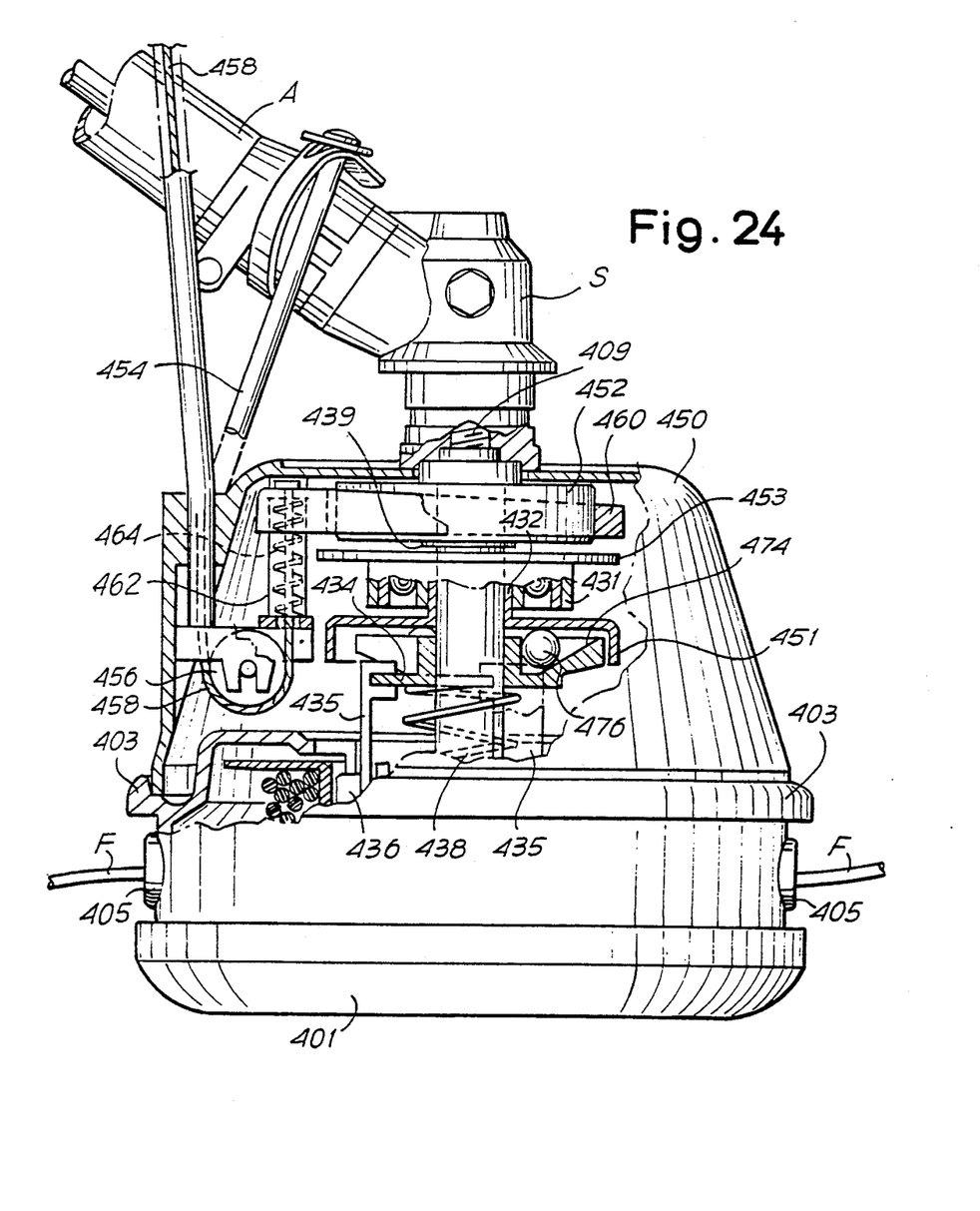
FIG. 24 is an axial section of an embodiment similar to the one of FIG. 17, with a device for automatic lengthening of the cords by means of centrifugal action.

FIG. 24 shows a device similar to the device of FIGS. 17 to 20. Same or corresponding elements are indicated with the same reference numbers. In this embodiment the small disk 434 is provided with inclinated rolling surfaces 474 on which balls 476 can roll. Balls 476 are housed between said inclined rolling surfaces 474 and disk 451 which is fitted on the pin 407, between the small disk 434 and the bearing 431. The bearing 431 supports a disk 453 which is similar to disk 430 of FIG. 17 and which is suitable to cooperate with the ring 460.

The device of FIG. 24 operates in the same way as the device of FIGS. 17 to 20, but has a further possibility of an automatic mode of operation, similar to the one described with reference to FIGS. 21 to 23. Pay-out of the cords can be performed either manually acting with ring 460 as above described with reference to FIGS. 17 to 20, or automatically due to the centrifugal force acting on balls 456. When the rotational speed of the device exceeds a certain value, determined by the inclination of surfaces 474, the force of spring 438 and the mass of balls 476, due to the wear of the cords, the balls 476 are moved radially outwardly by the centrifugal force. Being the upper position of disk 451 defined for example by a snap ring and being said disk 451 incapable of moving upwards with respect to the position shown in FIG. 24, the radial outward movement of balls 476 causes the downward movement of disk 434 and thus the rotation by one step of bobbins 416X, 416Y as already described. The consequent slowing down of the device causes the radial movement of the balls 476 toward the rotation axis and thus a further pay-out of cords F.

It should be noted that the device of FIG. 24 could work also only in the automatic mode by omitting ring 460 and cable 458. In this case the pay-out of cords F is obtained by way of centrifugal force only. It should also be noted that in this case the disk 451 could form a cover casing and the casing 450 could be omitted.

In both embodiments in which use of rolling balls is made, the latter could be suitably replaced by rollers which could be hollow, in order to reduce the mass of the roller. This could be advantageous when choosing the value of the mass of the rollers and the force of the spring 438 in order to set an optimum value of the rotational speed for which automatic pay-out of the cords is obtained.

I claim:

1. A grass-cutting apparatus for trimmers and the like, comprising;
   an upper housing member;
   a lower housing member;
   a central shaft including a first central shaft part connected to a second central shaft part to connect said upper housing member and said lower housing member to form a housing, said lower central shaft portion including an outer surface extending in an axial direction;
   a bobbin including an internal hole, said bobbin being positioned within said housing and supporting cords which are rolled up on said housing, said internal hole having a first series of teeth and a second series of teeth defining two series of mutually standard teeth, said first series being provided along a first axial section of said internal hole and said second series being provided along a second axial section of said internal hole;
   an axially slidable disk element having a central opening movably fixed to said lower shaft portion for guided movement between a lower end of said lower shaft portion and an upper end of said lower shaft portion, said axially sliding disk element projecting elastically from said housing in a lower position and being movable toward said housing by means of pressure exerted thereon; entrainment teeth provided on said axially slidable disk element, said entrainment teeth interacting with each of said first series of teeth and said second series of said teeth for alternately engaging said first series of teeth and said second series of teeth upon each axial stroke for permitting a unitary angular advance in two stages upon each axial stroke.

2. The apparatus as claimed in claim 1, wherein the disk element (34, 30; 34, 50; 134, 130; 334, 330) projects elastically below the housing (1, 3; 101, 103) and is capable of being made to reenter said housing by means of pressure on the ground.

3. The apparatus as claimed in claim 1, wherein said disk element (34, 30; 134, 130; 334, 330) is accommodated in a seat for sliding formed by a depression (3A; 103A; 303A) and by a wall (3B; 103B) and is stressed by a compression spring (38; 138; 338), the entrainment teeth (36; 136) sliding in slots (26; 126) formed in said wall (3b) and projecting from it in order to engage the teeth (20, 22) of the bobbin (16).

4. The apparatus as claimed in claim 3, wherein said spring (38; 138; 338) stresses the housing first part and second part (1, 3; 101, 104) in the engaged state by means of an axial connection (7, 10, 10A; 201, 110, 110A; 307, 310), and wherein means (14; 114) are provided for avoiding relative rotation of said housing first part and second part (1, 3; 101, 103).

5. The apparatus as claimed in claim 1, wherein said first housing member and second housing member are formed by two cap members (1, 3; 101, 103; 303) which can be engaged and disengaged in relation to one another, a first (3; 103; 303) of these engaging the bobbin and the second (1; 101) bearing the exit bushes (5) of the cords, said disk element (34, 30; 134, 130; 334, 330) being slidably accommodated in said first cap member (3; 103; 303) and projecting with the disk (30; 130; 330) at the bottom from a depression (3A; 103A; 303A) of said first cap member (3; 103; 303) as a result of elastic stress of said spring (38; 138; 338).

6. A grass-cutting apparatus according to claim 1, wherein said central shaft upper part includes a screw element and said central shaft lower portion includes a screw receiving portion, said upper portion and lower portion being screwed together for connecting said upper housing member and said lower housing member and said lower portion including a retaining head engaging a flange of said disk to maintain the flange of said disk between said retaining head and said lower housing member, a spring being provided between said lower housing member and said disk for biasing said disk to project elastically from said housing, said upper housing member and said lower housing member being formed as an upper cap member and lower cap member.

7. The grass-cutting apparatus according to claim 1, wherein said central shaft is axially slidable with respect to said disk member and angularly fixed with respect to said disk member for facilitating dismantling of said housing.

8. A grass-cutting apparatus for trimmers or the like comprising a housing (1, 3; 101, 103; 303; 401, 403) set in rotation, from which emerge the active ends of cords (F) which are rolled up on at least one bobbin (16; 116; 416) accommodated in the housing (1, 3; 101, 103; 303; 401, 403), capable of permitting a lengthening maneuver of said active ends during the rotation of said housing, wherein the bobbin (16; 116; 416) has in the wall (18) of an internal hole, two series of mutually staggered teeth (20, 22; 120, 122; 420, 422), some (20; 120; 420) of which are developed along one axial section and the others (22; 122; 422) along a successive axial section, wherein an element (34, 30; 34, 50; 134, 130; 334, 330; 434, 430; 434, 451) is provided, which is capable of axial sliding movements and forms a disk (20; 50; 130; 330; 430; 451) which projects elastically from the housing and is capable of being moved towards the housing by means of pressure exerted thereon, and wherein entrainment teeth (36; 136; 436) are provided on said element (34; 30; 134, 130; 334, 330), which are capable of interacting with said teeth (20, 22; 120, 122; 420, 422) of the two series, being axially slidable and rotationally engaged on said housing; said entrainment teeth (36; 136; 436) being capable of engaging alternately the teeth of the two series (20, 22; 120, 122; 420, 422) upon each axial stroke and thus of permitting each time a unitary angular advance in two stages and control means (460) are provided acting on the maneuvering disk (430) of the movable element (434, 430) for the lengthening of the cord.

9. The apparatus as claimed in claim 8, wherein said element (430, 434, 435) is partially accommodated in a seat for sliding (403X) formed by a wall (403B) of a cap member (401; 403), and is stressed by a spring (438), the entrainment teeth (436) sliding in longitudinal slots (426) formed in said wall (403B) and projecting from it in order to engage the teeth (420, 422) of the bobbin (416X, 416Y).

10. The apparatus as claimed in claim 9, wherein the cap member (403) which forms the wall (403B) constituting the seat for sliding of the movable element (430, 434, 435) has a cylindrical external wall (403A) which bears the bushes (405) for the passage of the cords (F).

11. The apparatus as claimed in claim 8, which comprises a protection casing (450) which can be restrained on the maneuvering shaft (A) of the trimmer so as not to rotate in relation to it, said means (460) of control for the lengthening of the cords being arranged in said casing (450).

12. The apparatus as claimed in claim 11, wherein said means of control comprise a ring (460) which is axially movable and restrained on a maneuvering cable (458).

13. The apparatus as claimed in claim 8, which comprises a pin (407), on which is mounted, so as not to be able to rotate in relation to it, one (403) of said cap members, said movable element (430, 434, 435) being supported in an axially slidable manner on said pin (407).

14. The apparatus as claimed in claim 13, wherein said protection casing (450) is supported idle on said pin (407).

15. The apparatus as claimed in claim 13, wherein the maneuvering disk (430) of said movable element is supported idle in relation to the pin (407).

16. The apparatus as claimed in claim 8, wherein said movable element comprises, in addition to said maneuvering disk (430), a small disk (434) which is axially movable by means of said maneuvering disk (430) and bears said entrainment teeth (436).

17. The apparatus as claimed in claim 16, wherein extensions (435) are anchored on said small disk (434), which form said entrainment teeth (436) and are guided in channels (437) which are integral with the cap member (403), on which the sliding slots (426) of said intrainment teeth are formed.

18. A grass-cutting apparatus for trimmers or the like comprising a housing (1, 3; 101, 103; 303; 401, 403) set in rotation, from which emerge the active ends of cords (F) which are rolled up on at least one bobbin (16; 116; 416) accommodated in the housing (1, 3; 101, 103; 303; 401, 403), capable of permitting a lengthening maneuver of said active ends during the rotation of said housing, wherein the bobbin (16; 116; 416) has in the wall (18) of an internal hole, two series of mutually staggered teeth (20, 22; 120, 122; 420, 422), some (20; 120; 420) of which are developed along one axial section and the others (22; 122; 422) along a successive axial section, wherein an element (34, 30; 34, 50; 134, 130; 334, 330; 434, 430; 434, 451) is provided, which is capable of axial sliding movements and forms a disk (20; 50; 130; 330; 430; 451) which projects elastically from the housing and is capable of being moved towards the housing by means of pressure exerted thereon, and wherein entrainment teeth (36; 136; 436) are provided on said element (34, 30; 134, 130; 334, 330), which are capable of interacting with said teeth (20, 22; 120, 122; 420, 422) of the two series, being axially slidable and rotationally engaged on said housing; said entrainment teeth (36; 136; 436) being capable of engaging alternately the teeth of the two series (20, 22; 120, 122; 420, 422) upon each axial stroke and thus of permitting each time a unitary angular advance in two stages and there are provided rolling elements (56; 476) acting on said maneuvering disk (50; 451) in order to control the sliding of said element (34, 50; 434, 451), said rolling elements cooperating with an inclined surface in such a way that the centrifugal force acting thereon causes the radial outward movement of the rolling elements and the sliding of the sliding element (34, 50; 434, 451) against the action of a counteracting spring (38; 438).

* * * * *